3,113,113
CORROSION INHIBITOR COMPOSITIONS
Byron E. Marsh, Brookfield, and Charles E. Tippett, Chicago, Ill., assignors, by mesne assignments, to Armour & Company, Chicago, Ill., a corporation of Delaware
No Drawing. Filed Nov. 7, 1958, Ser. No. 772,396
3 Claims. (Cl. 252—392)

This invention relates to corrosion inhibitor compositions and to a method for preparing these compositions.

It is well-known that the corrosion of metal surfaces by the action of acids is a serious problem. This difficulty is experienced in chemical and electrolytic pickling operations, acid dipping processes, plant "wash-out" procedures, petroleum well reactivation operations, and in the storage and transportation of acids and acid-containing fluids generally. The annual monetary loss to industry caused by acid corrosion is tremendous, and for this reason the inhibition of the activity of these agents has attained considerable importance.

It is a striking fact that owing to the widely different character of the conditions present in each situation where such corrosion is a problem, no single inhibitor has been found which is universally applicable. Compounds employed as inhibitors that are particularly effective in one area may be without influence or even harmful in another area. This makes it necessary, generally, to test the performance of several inhibitors to determine their suitability for a given use. Thus the search for better corrosion inhibitors, which is a continuing one, must necessarily be conducted largely on an empirical basis.

We have discovered corrosion inhibitor compositions which are highly effective under widely varying conditions of use. These compositions are particularly suitable for protecting metallic surfaces from the action of hydrochloric acid solutions, but generally may be employed in connection with any acid containing medium. The unexpectedly superior corrosion inhibiting properties of our compositions permit the use of much smaller quantities to achieve an anti-corrosion result than has been thought necessary with other inhibiting agents. This factor, of course, has important economic advantages to users.

It is, therefore, a general object of this invention to provide corrosion inhibitor compositions capable of highly effective action against acid corrosion under widely varying conditions of use. It is another object of this invention to provide corrosion inhibitor compositions capable of protecting metallic surfaces from the corrosive action of hydrochloric acid containing solutions in particular, and acid containing solutions in general. It is still another object of this invention to provide a method for preparing these corrosion inhibitor compositions. Further objects and advantages of this invention will become apparent as the specification proceeds.

It has been discovered that when an acetylenic alcohol, or alkynol, is reacted with certain amine materials and the reaction product formed thereby is combined with a suitable solubilizing substance or agent, the resulting composition can be employed to effectively inhibit the corrosive action of acid media on metal surfaces to a degree heretofore unrealized with inhibiting agents now commercially available.

The acetylenic alcohols, or alkynols, which may be employed in producing the reaction products of this invention are available from various commercial sources. Specific examples of alcohols having use for the purposes of this invention are propargyl alcohol (2-propyn-1-ol), butynediol (2-butyne-1,4-diol), hexynol (1-hexyn-3-ol), ethyloctynol (4-ethyl-1-octyn-3-ol), and derivatives of alkynols such as methylbutynol and methylpentynol. Although an effective result may be achieved with substantially any alkynol, or derivative thereof, propargyl alcohol is preferred. This agent is readily available at relatively low cost and permits the production of compositions capable of optimum corrosion inhibition.

In accordance with the preferred practice of this invention an alkynol is reacted with a suitable aliphatic or alicyclic substituted amine material to form a reaction product. The amine materials finding use for this purpose are aliphatic or alicyclic amines selected from the group consisting of primary and secondary amines having the formulae $RNH_2$ and $RR'NH$, and substituted polymethylene diamines having the formula $$RNH(CH_2)_xNH_2$$

wherein in each instance R and R' are hydrocarbon radicals containing from 8 to 22 carbon atoms, the radicals being the same or different in the case of the secondary amines, and $x$ is an integer of from 2 and 6.

Examples of primary amines coming within the above definition include octylamine, decylamine, dodecylamine, tetradecylamine, hexadecylamine, octadecylamine, octadecenylamine, octadecadienylamine, eicosylamine and mixtures of the foregoing such as are obtained by the ammonolysis, dehydration, and hydrogenation of the mixed fatty acids obtained from the hydrolysis of naturally occurring animal and vegetable fats such as coconut oil, soybean oil, tallow, cottonseed oil, and the like. A particularly suitable material sold under the trademark  Armeen is a mixture containing approximately 2% tetradecylamine, 24% hexadecylamine, 28% octadecylamine and 46% octadecanylamine.

Examples of secondary amines coming within the above definition include di-n-octadecylamine, di-n-decylamine, di-n-dodecylamine, di-n-tetradecylamine, di-n-hexadecylamine, n-octyl-octadecylamine, n-octyldodecylamine, and n-octyl-tetradecylamine. These secondary fatty alkyl amines may be obtained by hydrogenation of nitriles at relatively high temperatures. It is believed that under these conditions, primary amines add to the alkylidene imines formed as an intermediate in the hydrogenation of the nitriles, to yield the secondary amines.

Suitable alkyl substituted polymethylene diamines having use for the purposes of the present invention are produced by the reaction between a specifically defined primary amine and acrylonitrile followed by the reduction of the nitrile group with hydrogen. Compounds of this type are sold under the trademark Duomeen. In general, any polymethylene diamine compound, one of whose amino hydrogens is replaced by a long-chain aliphatic group having 8 to 22 carbon atoms will serve. N-substituted polymethylene diamine compounds such as the following representative members may be employed: N-octyl, N-decyl, N-dodecyl, N-dodecenyl, N-tetradecyl, N-tetradecenyl, N-hexadecyl, N-hexadecenyl, N-octadecyl, N-octadecenyl, and N-octadecadienyl. Mixtures of diamine compounds may also be employed, particularly mixtures of diamines derived from naturally occurring fats and oils such as soybean oil, coconut oil, tallow, and the like. The class of compounds designated by the trademark Duomeen preferably contain from 2 to 6 methylene groups between the nitrogen atoms. Especially good results are obtained when the compound contains 3 methylene groups.

The reaction between the alkynol and the amine material may be carried out without special apparatus and can be conducted in any convenient vessel adapted to contain the reactants. The alkynol and the amine are simply introduced into the vessel in suitable proportions, no solvents or catalysts being required. Although the advantages of this invention may be realized with from about 1 to about 4 moles of the alkynol per mole of amine material, optimum results are obtained with about 2 moles of the alkynol to about 1 mole of amine material.

Indications are that the reaction could be conducted at room temperature; however, this is impractical because of the length of time necessary to derive the desired reaction product. It is, therefore, preferred to heat or reflux the reactants for from about 1 to about 8 hours at a temperature from between about 60° C. to about 150° C. Optimum results are achieved, however, if the alkynol and amine material are reacted under reflux conditions for about 5 hours at a temperature between about 95° C. and about 115° C.

The reaction product formed by the alcohol and the amine is generally a thin, dark amber liquid which is believed to be a mixture of materials incapable of ready separation. The product itself usually requires no further treatment and may be employed immediately upon completion of the reaction.

In accordance with the preferred practice of this invention the reaction product formed by the alkynol and amine material may be advantageously employed in combination with a suitable solubilizing substance or agent. The preferred solubilizers are sold under the trademarks Ethomeen and Ethoduomeen. The compounds designated under Ethomeen are tertiary amines represented by the general formula:

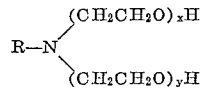

where R is an aliphatic hydrocarbon radical having from 8 to 22 carbon atoms and $x$ and $y$ are integers the sum of which may be between 2 and 50.

The preferred solubilizing substances designated by the trademark Ethoduomeen are represented by the general formula:

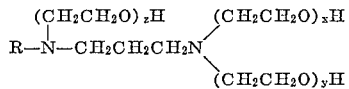

wherein R is an aliphatic hydrocarbon radical having between 8 and 22 carbon atoms and $x$, $y$, and $z$ are integers the sum of which may be from 2 to 50. These compounds are prepared by initially reacting a long-chain primary amine with acrylonitrile followed by reduction of the nitrile group to an amine. This results in the formation of an N-aliphatic trimethylenediamine which is then condensed with from 2 to 50 moles of ethylene oxide to produce the diamine illustrated.

Aliphatic hydrocarbon radicals coming within the definition of R of the preferred solubilizing agents include octyl, dodecyl, tetradecyl, pentadecyl, hexadecyl, heptadecyl, octadecyl, eicosyl, docosyl, octadecenyl, octadecadienyl, octadecatrienyl, and statistical mixtures of the foregoing radicals such as are contained in naturally occurring oils and fats such as tallow, soybean oil, coconut oil, and the like.

The ethylene oxide content of these preferred solubilizing agents tends to influence the effectiveness of our corrosion inhibition compositions. Although the number of moles of ethylene oxide may range from 2 to about 50, it is preferred that the solubilizing substance contain about 10 to about 20 moles of ethylene oxide, with optimum effects being realized with about 15 moles of the oxide.

In accordance with the present invention, suitable results may be obtained with our compositions with from about 25% to about 75% by weight of the reaction product of the alkynol and the amine material in combination with from about 75% to about 25% by weight of the solubilizing agent. The preferred ratio by weight is about 50% of the reaction product to about 50% of solubilizing agent. No special conditions are necessary to form the compositions. One component is simply added to the other in the desired proportions.

The amount of inhibitor composition which should be incorporated into a system containing an acid medium can be varied widely and is largely dependent on the concentration of the acid in the system. A result has been obtained with as little as 0.01% by weight of the compositions. In general, economics will govern and only that quantity of the inhibitor which will produce the result desired will be introduced into a system. Our compositions are liquid at room temperature and are readily soluble in an acid containing medium. Unlike other inhibitors, the compositions of this inventon are not dispersible and do not leave a residue in the treated system.

The exact nature of the action of our corrosion inhibitor compositions is not known. It is believed, however, that they are adsorption type inhibitors which form a barrier on a metallic surface thereby inhibiting contact of the corrosive agent with the metallic surface.

The following specific examples of these novel compositions and of their preparation will further illustrate the invention.

EXAMPLE I

One mole of a primary tallow amine and 2 moles of propargyl alcohol were refluxed at 110° F. for about 5 hours. The reaction product thus formed was a thin, dark amber liquid which was solubilized in N-tallow-N,N′,N′-tris(2-hydroxyethyl)trimethylenediamine. The primary tallow amine is sold under the trademark Armeen T, and is a mixture such as is found in tallow (T) containing approximately 2% tetradecylamine, 24% hexadecylamine, 28% octadecylamine and 46% octadecenylamine. The diamine is sold under the trademark Ethoduomeen T/25, the "T" again indicating it is derived from tallow and the number "25" designating that 15 moles of ethylene oxide are present. A 50–50 ratio by weight combination of the reaction product and the solubilizer were tested for anti-corrosion effects as follows:

A series of 8 oz. bottles containing 150 ml. of an acid solution and a quantity of the inhibitor were placed in an oil bath. Pre-weighed coupons of mild steel approximately 1″ x 3″ x 1/16″ were submerged in the acid solutions and maintained at room temperature for 185 hours. The coupons were then removed from the solutions, washed in hot water, rinsed in hot alcohol, dried with acetone, and reweighed. The results are tabulated below:

*Table I*

| | lb./ft.²/day | Percent HCl | Percent Inhibitor | Condition of Coupons |
|---|---|---|---|---|
| 1 | .0228 | 5 | | Dark, pitting around edge. |
| 2 | .000568 | 5 | .04 | Bright, no pitting. |
| 3 | .000567 | 5 | .06 | Do. |
| 4 | .000569 | 5 | .08 | Do. |
| 5 | .0372 | 10 | | Dark, pitting around edge. |
| 6 | .000687 | 10 | .05 | Bright, no pitting. |
| 7 | .000736 | 10 | .08 | Do. |
| 8 | .000635 | 10 | .12 | Do. |
| 9 | .0745 | 15 | | Dark, pitting around edge. |
| 10 | .000697 | 15 | .1 | Bright, no pitting. |
| 11 | .000666 | 15 | .15 | Do. |
| 12 | .000602 | 15 | .25 | Do. |

EXAMPLE II

The corrosion inhibitor composition of Example I was tested as in Example I, the mild steel coupons, however, being maintained at a constant temperature, in one instance, of 175° F., and in another, of 200° F., in the presence of $FeCl_3$. Ferric ion has been observed to accelerate corrosion. The results of these tests are tabulated below:

Table II

| Percent HCl | Inhibitor | Percent FeCl₃ | 175° F. | | 200° F. | |
|---|---|---|---|---|---|---|
| | | | Lb./ft.²/day | Condition of Coupon | Lb./ft.²/day | Condition of Coupon |
| 5 | Blank | 0 | 1.34 | Severe pitting | 1.39 | Severe pitting. |
| 5 | .08 | 0 | .0047 | No pitting | .0123 | No pitting. |
| 5 | .06 | 0 | .0062 | do | .0153 | Do. |
| 5 | .04 | 0 | .0074 | do | .0210 | Do. |
| 5 | Blank | .3 | 1.36 | Severe pitting | 1.4 | Severe pitting. |
| 5 | .1 | .3 | .0259 | Pitting | .030 | Pitting. |
| 5 | .15 | .3 | .0244 | do | .026 | Do. |
| 5 | .2 | .3 | .0246 | do | .026 | Do. |
| 7.5 | Blank | 0 | 1.79 | Severe pitting | 1.97 | Severe pitting. |
| 7.5 | .12 | 0 | .0069 | No pitting | .015 | No pitting. |
| 7.5 | .08 | 0 | .0082 | do | .017 | Do. |
| 7.5 | .05 | 0 | .0094 | do | .0256 | Do. |
| 7.5 | Blank | .3 | 1.84 | Severe pitting | 1.87 | Severe pitting. |
| 7.5 | .15 | .3 | .024 | Pitting | .023 | Pitting. |
| 7.5 | .25 | .3 | .022 | do | .025 | Do. |
| 7.5 | .3 | .3 | .023 | do | .023 | Do. |
| 10 | Blank | 0 | 2.52 | Severe pitting | 2.62 | Severe pitting. |
| 10 | .12 | 0 | .011 | No pitting | .014 | No pitting. |
| 10 | .08 | 0 | .011 | do | .020 | Do. |
| 10 | .05 | 0 | .014 | do | .020 | Do. |
| 10 | Blank | .3 | 2.54 | Severe pitting | 2.52 | Severe pitting. |
| 10 | .15 | .3 | .0274 | Pitting | .0286 | Pitting. |
| 10 | .25 | .3 | .027 | do | .027 | Do. |
| 10 | .3 | .3 | .026 | do | .025 | Do. |
| 15 | Blank | 0 | 4.45 | Lasted 4 hours | 5.9 | Lasted 3 hours. |
| 15 | .25 | 0 | .0128 | No pitting | .019 | No pitting. |
| 15 | .15 | 0 | .016 | do | .026 | Do. |
| 15 | .1 | 0 | .0177 | do | .031 | Do. |
| 15 | Blank | .3 | 4.40 | Lasted 4 hours | 5.9 | Lasted 3 hours. |
| 15 | .25 | .3 | .0278 | No pitting | .0306 | No pitting. |
| 15 | .3 | .3 | .0278 | do | .030 | Do. |
| 15 | .5 | .3 | .024 | do | .027 | Do. |

EXAMPLE III

One mole each of (1) octylamine, (2) decylamine and (3) octadecylamine were reacted with 2 moles of propargyl alcohol. The reaction was conducted at a temperature of 100° C. for approximately 5 hours. The product was solubilized in Ethoduomeen T/25 in a 50–50 by weight ratio. Coupons of mild steel were placed as described in Example I in bottles containing a solution of 15% HCl, 0.25% of the inhibitor, and 0.3% FeCl₃, and maintained at a temperature of 200° F. for 6 hours. The results are set out below:

Table III

| | Lb./ft.²/day | Condition of Coupons |
|---|---|---|
| (1) | 0.0358 | No pitting. |
| (2) | 0.0425 | Do. |
| (3) | 0.0362 | Do. |

EXAMPLE IV

One mole of the amine material employed in Example I and two moles of butynediol were refluxed at 100° C. for 5 hours. The reaction product was solubilized in Ethoduomeen T/25 using equal proportions of each. A mild steel coupon was submerged in a 15% hydrochloric acid solution containing 0.25% of the inhibitor composition and heated at 200° F. for 6 hours. Reweighing revealed a corrosion rate of 0.044 lb./ft.²/day. The coupon was bright, with no signs of pitting.

EXAMPLE V

Using a 50–50 ratio by weight combination of the reaction product obtained in Example I and different solubilizing agents, namely, Ethomeen C/25 ("C" indicating that the hydrocarbon radicals are mixtures derived from coconut oil and comprise octyl, decyl, dodecyl, tetradecyl, hexadecyl, octadecyl, octadecenyl, and octadecadienyl radicals; the number "25" designating that 15 moles of ethylene oxide are present). Ethomeen S/20 ("S" indicating that the hydrocarbon radicals are mixtures derived from soybean oil and comprise hexadecyl, octadecyl, octadecenyl and octadecadienyl radicals; the number "20" designating that 10 moles of ethylene oxide are present); and Ethomeen T/25 and T/15 ("T" indicating that the hydrocarbon radicals are mixtures derived from tallow and comprise dodecyl, tetradecyl, tetradecenyl, hexadecyl, hexadecenyl, octadecyl, octadecenyl, octadecadienyl, eicosyl, and eicosenyl radicals; the number 25 and 15 designating that 15 and 5, respectively, moles of ethylene oxide are present).

The compositions were tested for their corrosion inhibiting effects as described in Example I. The acid solutions contained 15% HCl, 0.3% FeCl₃, and 0.25% of the inhibitor. The coupons were heated to a temperature of 200° F. for 6 hours. The results were as follows:

Table IV

| Solubilizer | Lb./ft.²/day | Condition of Coupon |
|---|---|---|
| Ethomeen C/25 | .0403 | Bright, no pitting. |
| Ethomeen S/20 | .0324 | Bright, slight pitting around edge. |
| Ethomeen T/25 | .0326 | Do. |
| Ethomeen T/17 | .0320 | Do. |

In the foregoing examples we have described advantageous methods for preparing highly effective corrosion inhibitor compositions, but we do not wish to be limited to the exact operating conditions stated. It is understood that a modification of the quantities and types of materials employed and the temperature and reaction times indicated could be modified to affect the results obtained.

Since the reaction products derived from the alkynol and the amine material in accordance with the practice of this invention have an uncertain constitution, and the exact nature of the reaction is not definitely established, we are obliged to define the reaction products incorporated in our corrosion inhibitor compositions by referring to the process for deriving them.

We claim:

1. A composition for inhibiting corrosion of metallic surfaces consisting essentially of about 25 to 75% by weight of a solubilizer selected from the group consisting of polyalkoxylated mono- and diamines having the formulae:

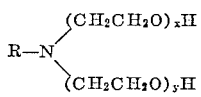

and

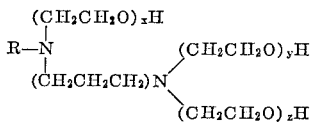

wherein R is an aliphatic hydrocarbon radical having from 8 to 22 carbon atoms and $x$, $y$ and $z$ are integers, the sum of which is from 2 to 50 and a corresponding amount of about 75% to 25% by weight of the reaction product of 1 to 4 moles of an acetylenic alcohol containing from 3 to 10 carbon atoms with one mole of an amine selected from the group consisting of primary and secondary amines having the formulae:

and

and substituted polymethylene diamines having the formula:

$$RNH(CH_2)_xNH_2$$

wherein, in all appropriate instances, R and R' are hydrocarbon radicals containing from 8 to 22 carbon atoms, and $x$ is an integer of from 2 to 6.

2. The composition of claim 1 wherein the acetylenic alcohol comprises 2-butyne-1,4-diol and the amine comprises primary tallow amine.

3. The composition of claim 1 wherein the acetylenic alcohol comprises 2-propyn-1-ol and the amine comprises primary tallow amine.

References Cited in the file of this patent

UNITED STATES PATENTS

| | | |
|---|---|---|
| 2,649,415 | Sundberg | Aug. 10, 1953 |
| 2,814,593 | Beiswanger et al. | Nov. 26, 1957 |
| 2,894,905 | Bernard | July 14, 1959 |
| 2,975,125 | Saukaitis et al. | Mar. 14, 1961 |

FOREIGN PATENTS

| | | |
|---|---|---|
| 1,024,773 | Germany | Feb. 20, 1958 |

OTHER REFERENCES

"Duomeens," published by Armour and Co., pp. 1–5, received in Sci. Lib. February 21, 1956.